Nov. 18, 1958   J. J. B. LAIR   2,861,264
DIRECTION FINDER SYSTEM
Filed April 12, 1955

INVENTOR
JULIEN J. B. LAIR
BY Ernest Fanwick
ATTORNEY

United States Patent Office 2,861,264
Patented Nov. 18, 1958

2,861,264
DIRECTION FINDER SYSTEM

Julien J. B. Lair, Glen Ridge, N. J., assignor to International Telephone and Telegraph Corporation, Nutley, N. J., a corporation of Maryland Application April 12, 1955, Serial No. 500,742

5 Claims. (Cl. 343—113)

This invention relates to direction finder systems and more particularly to a direction finder system utilizing the "doppler" principle.

In accordance with the doppler principle, an electromagnetic wave receiver detects an apparent change of frequency of received wave dependent upon a change of relative velocity between the source of waves and the receiving device. As the receiver is moved toward the source, the doppler frequency increases and conversely the doppler frequency decreases as the distance between the source and receiving locations increases. The doppler phenomenon has in the past been utilized in determining the direction of a source of radio frequency signals in systems where a vertical dipole or other type of antenna was mounted on a support and rotated in the horizontal plane at a constant rate. The rotating antenna traversed a large number of differently phased incoming wave fronts during each revolution and the relative phase of the carrier signal which was induced in the antenna increased and decreased as the antenna moved around the periphery of the circle of rotation and thus away from and toward the source of signals. In other words, the rate of frequency change or the change in doppler frequency was at a maximum when the antenna moved in a direction parallel to the incoming wave direction and was at a minimum when the antenna was moved perpendicularly to the direction of the incoming wave. The azimuth and sense of the incoming wave could then be determined by detecting the maximum doppler frequency or the minimum doppler frequency. Obviously, direction finding systems which required the pickup devices or antennas to be rotated through 360° and yet which utilized the signals for direction finding purposes only during that portion of time when the antenna was moving perpendicularly or parallel to the incoming wave front were essentially useless during the greatest portion of time and thus operated at a low efficiency.

One of the objects of this invention, therefore, is to provide a direction finder system particularly useful at very high frequencies with a high degree of efficiency.

Another object of this invention is to provide a direction finder system which is not dependent upon a sense antenna or the equivalent thereof.

A further object of this invention is to provide a direction finding system of high efficiency dependent upon the doppler effect.

In accordance with one of the features of this invention, an antenna is provided which is mounted upon a mechanism which imparts thereto a periodic and harmonic movement along a linear axis. A reference signal is generated in accordance with the harmonic motion of the antenna and the antenna is rotated in azimuth until a maximum or minimum doppler signal amplitude is obtained. The doppler signal is compared to the reference signal in a comparator circuit which only compares signals of like phase and frequency to yield an indication of the doppler energy.

In another embodiment of my invention, a combination vibrating and rotating differential direction finder system is used in which a pair of antennas vibrating in opposite direction have their induced signals subtracted one from the other and coupled to a receiver and the doppler envelope wave of the received signal is detected to yield the azimuth indication of the source of signals from the receiver.

The above mentioned and other features and objects of this invention will become more apparent by reference to the following description taken in conjunction with the accompanying drawings; in which, Fig. 1 is a schematic diagram in block form of one embodiment of the direction finding system of my invention utilizing a reciprocating antenna;

Figure 1:
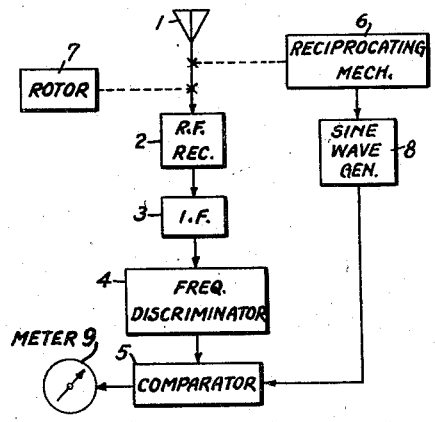

Referring to Fig. 1 of the drawings, a direction finder in accordance with the principles of my invention is shown to comprise an antenna 1 and the signals induced in the antenna 1 are coupled to a radio frequency (R.-F.) receiver 2 for detection. The output of the R.-F. receiver 2 is coupled to the intermediate frequency stage 3 in accordance with well known radio principles. The output of the I.-F. stage 3 is coupled to the usual type frequency discriminator circuit 4, the output of which comprises energy at the doppler frequency which is coupled to the comparator circuit 5. The antenna 1 is mounted upon a reciprocating mechanism 6 which causes it to move with a periodic and harmonic motion causing it to move to and fro along a given linear axis in accordance with sine law principles. The reciprocating mechanism 6 is mounted on rotating means 7 which allows the linear axis of harmonic motion imparted to antenna to be aligned in any azimuthal direction. Obviously, the antenna 1, in accordance with the principles of this invention, may be either directional or nondirectional in its reception characteristics. A sine wave generator 8 responsive to the motion imparted by the reciprocating mechanism generates a reference wave of sinusoidal characteristics which is coupled to the comparator 5. The comparator 5 detects the maximum doppler energy when the reciprocating motion of the antenna 1 is in line with the source of signals and will yield a minimum signal when the reciprocating axis is at right angles to a source of signals. The output of the comparator 5 is coupled to a meter 9 to indicate the magnitude of doppler energy.

Figure 2:
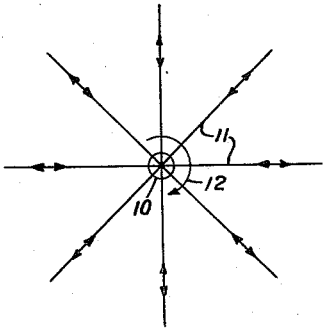
Fig. 2 is a schematic illustration of the relative motion of the antenna means shown in Fig. 1.

A schematic illustration of the antenna motion is shown in Fig. 2. The antenna is located at the hub 10 of the motion pattern and is caused to reciprocate along a linear axis or radial 11. The azimuth direction of the linear motion 11 may be varied due to the motion imparted by the rotor 7 and indicated by arrow 12. Thus the total antenna motion comprises a reciprocating movement 11 in conjunction with a rotary movement indicated by arrow 12 and in the total yields a plurality of radii in all azimuth directions.

The doppler effect is best illustrated by considering a receiving antenna or detector moving with a velocity $v$ in the field of propagation of a transmitted wave having frequency $F_0$. The frequency of the receiver signal $F_R$ detected by the moving antenna would be equal to:

$$F_R = F_0\left(1 + \frac{v_c}{V}\right) \qquad (1)$$

where V is the velocity of propagation of the incoming wave and $v_c$ is the component of the receiving antenna motion in the direction of the incoming wave and is positive when the receiving antenna moves toward the source of signals and is negative when the distance between the detector and the transmitter is increasing. The doppler frequency or doppler energy $\Delta F$ may be defined as the difference between the transmitted signal frequency $F_0$ and the frequency of the received signal $F_R$ and thus:

$$\Delta F = F_R - F_0 = F_0\left(\frac{v_c}{V}\right)$$

Figure 3:
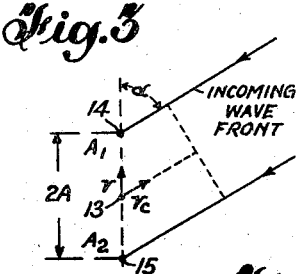
Fig. 3 is a vector diagram helpful in the analysis of the operation of my invention.

Referring to Fig. 3, let it be assumed that an antenna 13 is moving back and forth when a reciprocating motion in a harmonic manner is applied to it, between two extreme points 14 and 15. The total distance moved will be equal to twice the distance between points 14 and 15 or 2A and let it be assumed that the frequency of the antenna 13 is equal to N. Thus it may be stated that the equation of movement of the antenna 13 is $$y = A \sin 2\pi Nt \qquad (2)$$

and that the velocity is equal to $$v = \frac{dy}{dt} = A2\pi N \cos 2\pi Nt \qquad (3)$$

Let it also be assumed that an angle $\alpha$ exists between the axis of movement of the antenna 13 and the incoming wave and that the component of antenna motion $v_c$ in the direction of the incoming wave is the equal to:

$$v_c = v \cos \alpha = A2\pi N \cos 2\pi Nt \times \cos \alpha \qquad (4)$$

The frequency of the radio energy received between antenna 13 is then:

$$F_R = F_0\left(1 + \frac{A2\pi N \cos 2\pi Nt \times \cos \alpha}{V}\right) \qquad (5)$$

and the doppler frequency is equal to:

$$\Delta F = F_R - F_0 = F_0\left(\frac{A2\pi N \cos 2\pi Nt \times \cos \alpha}{V}\right) \qquad (6)$$

As will be readily understood by those skilled in this art, the maximum doppler frequency will exist when the angle $\alpha$ equals zero and the reciprocating motion of the antenna is parallel with the direction of the incoming wave. The maximum doppler frequency also exists when the $$\cos 2\pi Nt = \pm 1 \qquad (7)$$

and thus maximized doppler frequency is equal to:

$$\Delta F = \pm F_0\left(\frac{A2\pi N}{V}\right) \qquad (8)$$

Obviously, the doppler frequency will be small and can be detected in a frequency discriminator which has a bandwith covering the possible variations of the carrier frequency $F_0$. A frequency filter following the frequency discriminator is desirable to reduce the bandwidth to the doppler frequency in order to improve the signal to noise ratio.

When the angle $\alpha$ is 90°, or in other words the axis of reciprocation is perpendicular to the axis of the incoming signals, there is no doppler frequency. However, the value of the doppler frequency is proportional to $\cos \alpha$ and the maximum sensitivity to determine the direction of the incoming wave will exist around the minimum of the doppler effect when the $\alpha$ equal 90°. Obviously, any system which utilizes a single loop or dipole to get the direction of the incoming wave either manually or automatically can also be utilized with a reciprocating antenna to get an improved result.

It can be observed that Equation 6 can be written as:

$$\Delta F = K_D F_0 \qquad (9)$$

where $K_D$ is the doppler coefficient which for a vibrating antenna is equal to:

$$K_D = \frac{AN2\pi \cos 2\pi Nt \times \cos \alpha}{V} \qquad (10)$$

and when $$\cos 2\pi Nt \times \cos \alpha = 1 \qquad (11)$$

the doppler coefficient maximum is:

$$K_D = \frac{2\pi AN}{V} \qquad (12)$$

The value of the doppler coefficient is limited in practice by the maximum value which can be mechanically obtained for the product $A \times N$ which is equal to the amplitude of vibration, times the rate of vibration. For any given antenna it may be advantageous to increase the amplitude or distance of vibration and decrease the rate of vibration in order to get a maximum $A \times N$ product, while for short wave lengths it may be easier to decrease the distance and increase the frequency.

Figure 4:
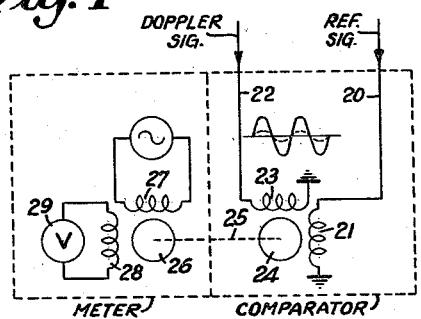
Fig. 4 is a schematic circuit diagram partly in block form of one comparator device useful in cooperation with the direction finding system of my invention.

Referring to Fig. 4 of the invention, one type of comparator which may be utilized with a direction finder system in accordance with the principles of my invention is therein shown to comprise a two phase motor in which the reference signal generated in response to the reciprocating mechanism in sine wave generator 8 is coupled over line 20 to a stator or field winding 21. Obviously, the sine wave generator 8 should be so related to the reciprocating energy imparted by mechanism 6 as to be in quadrature relation with harmonic motion of the antenna or, in other words, 90° out of phase. The doppler energy detected by frequency discriminator 4 is coupled over line 22 to the other field winding 23 of a two phase motor in the comparator. The voltages induced in the stator 24 cause it to rotate and the stator 24 is mechanically coupled via mechanical linkage 25 to the drag cup 26 of the tachometer which is rotated. Providing a source of voltage is coupled to one field coil 27 of the tachometer a voltage is induced in field coil 28 which is proportional to the speed of rotation in the rotor 24. This voltage may be detected by a voltmeter 29 whose indication would be proportional to the speed of rotation in the rotor 24. Since the reference signal coupled to the stator winding 21 is of constant frequency, only signals of equal frequency coupled to the field winding 23 will cause rotation of the rotor 24. In addition, since the reference signal is generated in the response to the reciprocating motion mechanism, the doppler frequency signals are locked in phase with the reference signal. Since frequency and phase are constant, the only variable affecting the speed of rotation of the rotor 24 would be the amplitude of the doppler energy which is maximum when the axis of reciprocation is in line with the axis of the incoming wave. Thus it is seen that only signals having the same frequency as the doppler frequency can effect the reading or the determination derived from this direction finder system and in effect the comparator circuit functions as a frequency filter to eliminate all noise and to separate the doppler energy and be responsive only to the doppler energy.

As will be readily understood by those skilled in the electronic art, there are many comparator circuits, particularly phase comparators, which will yield an equivalent output indicative of amplitude when the input signals comprising a reference signal of given frequency phase and amplitude and a signal whose amplitude is to be measured but which is locked in phase with the reference signal and is of the same frequency even though extraneous signals such as noise are also coupled to the comparator circuit.

Figure 5:
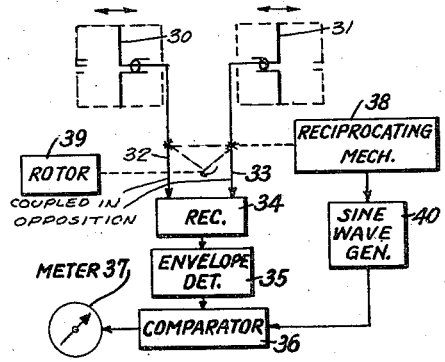
Fig. 5 is a schematic diagram in block form of a combination reciprocating and rotating antenna differential direction finder system in accordance with my invention; and, Fig. 6 is a system of curves helpful in the explanation of the direction finder system shown in Fig. 5.

Referring to Fig. 5 of the drawings, another embodiment of a direction finding system in accordance with the principles of my invention is shown in which a pair of dipole antennas 30 and 31 are mechanically mounted in such a manner as to reciprocate or vibrate in opposite directions and, in other words, 180° out of phase. The pair of antennas can also be rotated about 360° of azimuth in accordance with the principles explained in the description of Fig. 1. The signals induced in the antennas 30 and 31 are coupled to a receiver 34 over lines 32 and 33 in a differential manner so that they are subtracted one from the other. The output of the receiver 34 is coupled to envelope detector 35 whose output comprises the energy at the differential doppler frequency and is coupled to a comparator 36 whose output is indicated on a meter 37.

Figure 6:
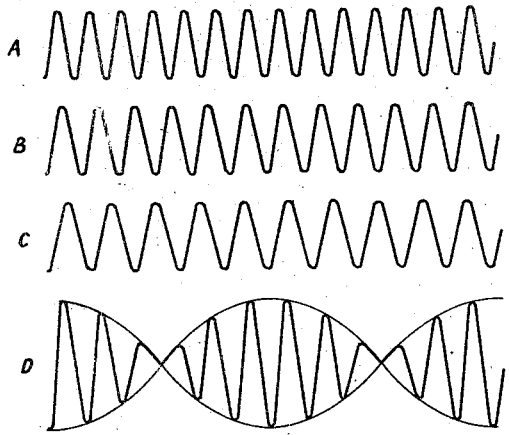

Referring to Fig. 6 and assuming that the antennas 30 and 31 are both oscillating along an axis in line with the axis of the incoming wave having frequency $F_0$ as shown in curve B, the frequency induced in the antenna 30 moving toward the source of signals will be greater as indicated by curve A and the frequency of the signal induced in the antenna 31 moving away from the source of signals will be less than $F_0$ as shown in curve C. As heretofore explained, the frequencies of the signals induced in antenna 30 is $$F_{R_{30}} = F_0\left(1 + \frac{A2\pi N \cos 2\pi Nt}{V}\right) \quad (13)$$

and that induced in antenna 31 is $$F_{R_{31}} = F_0\left(1 - \frac{A2\pi N \cos 2\pi Nt}{V}\right) \quad (14)$$

Since the outputs of two antennas are coupled in opposition, the signals induced or the signals detected in the receiver 34 would be equal to $$2\cos 2\pi F_0 \times \cos 2\pi F_0\left(\frac{A2\pi N \cos 2\pi Nt}{V}\right) \quad (15)$$

Referring to curve D of Fig. 6, it is seen that the receiver 34 detected a signal in which the carrier has the frequency $F_0$ and has an envelope modulation equal to twice the original amplitude. Since in most cases the doppler frequency is extremely small, it is far easier to detect a signal at twice the amplitude.

While I have described above the principles of my invention in connection with specific apparatus, it is to be clearly understood that this description is made only by way of example and not as a limitation to the scope of my invention as set forth in the objects thereof and in the accompanying claims.

I claim:

1. A direction finding receiver system for determining the direction of arrival of a signal wave comprising an antenna, a receiver coupled thereto, means for causing said antenna to move in a harmonic manner along a predetermined linear axis, means to rotate said antenna while said antenna is moving in said harmonic manner, frequency discriminator means coupled to said receiver for detecting the doppler frequency energy of the receiver output due to the movement of said antenna and comparator means coupled to said frequency discriminator means for indicating the magnitude of said doppler energy.

2. In a direction finding system means for receiving electromagnetic wave energy at a point which is periodically and harmonically moving along a predetermined linear axis relative to the source of said electromagnetic wave energy, means to detect the doppler frequency energy due to the movement of said receiving means, means to generate a reference signal of predetermined amplitude responsive to the harmonic movement of said receiving means, means to compare doppler energy having a period equal to the period of movement of said antenna with said reference signal to yield an indication of doppler energy magnitude and rotatable means to vary the azimuthal direction of said linear axis to obtain the maximum output of said comparison means.

3. A direction finding receiver system for determining the direction of arrival of electromagnetic wave signals comprising first and second antenna means, means to move each of said antenna means periodically and harmonically along predetermined linear axis relative to the source of said electromagnetic wave signals, the movement of said first and second antennas being in opposite directions, means for generating a reference wave relative to said harmonic movement, receiver means to subtract and detect from each other the signals received by said antennas, and means to detect the envelope wave signal output of said receiver means and means to determine the magnitude of the energy content of said envelope wave relative to said reference wave.

4. A direction finding receiver system for determining the direction of arrival of electromagnetic wave signals comprising a first and second dipole antennas, a receiver, means to couple the signals induced in each of said dipoles to said receiver, means to move each of said antenna means periodically and harmonically along predetermined linear axis relative to the source of said electromagnetic wave signals, the movement of said first and second antennas being in opposite directions, means for generating a reference wave relative to said harmonic movement, means to detect the envelope wave modulation in the output of said receiver due to the movement of said first and second dipole antennas and means to determine the magnitude of the energy content of said envelope wave relative to said reference signal.

5. A direction finding receiver system for determining the direction of arrival of electromagnetic wave signals comprising a first and second dipole antennas, a receiver, means to couple the signals received by each of said dipoles to said receiver, means to move each of said antenna means periodically and harmonically along predetermined linear axis relative to the source of said electromagnetic wave signals, the movement of said first and second antennas being in opposite directions, means for generating a reference wave relative to said harmonic movement, means to detect the envelope wave modulation in the output of said receiver due to the movement of said first and second dipole antennas, means to determine the magnitude of the energy content of said envelope wave relative to said reference signal and means to vary the azimuthal direction of said linear axis.

References Cited in the file of this patent

UNITED STATES PATENTS

| | | |
|---|---|---|
| 2,411,518 | Busignies | Nov. 26, 1946 |
| 2,412,631 | Rice | Dec. 17, 1946 |
| 2,414,798 | Budenbom | Jan. 28, 1947 |
| 2,481,509 | Hansel | Sept. 13, 1949 |